March 8, 1966 K. BIELFELDT ETAL 3,239,203
APPARATUS FOR THE RECOVERY OF GALLIUM
Filed June 19, 1962 3 Sheets-Sheet 1

Inventors:
Max Laspeyres
Klaus Bielfeldt
by Richard S. Striker
Attorney

March 8, 1966 K. BIELFELDT ETAL 3,239,203
APPARATUS FOR THE RECOVERY OF GALLIUM
Filed June 19, 1962 3 Sheets-Sheet 3

Inventors:
Klaus Bielfeldt
Max Laspeyres
by Michael S. Striker
Atty

United States Patent Office 3,239,203
Patented Mar. 8, 1966

3,239,203
APPARATUS FOR THE RECOVERY OF GALLIUM
Klaus Bielfeldt and Max Laspeyres, Schwandorf, Germany, assignors to Vereinigte Aluminium-Werke Aktiengesellschaft, Bonn, Germany
Filed June 19, 1962, Ser. No. 203,597
Claims priority, application Germany, Aug. 12, 1959, V 17,063; June 21, 1961, V 20,840
3 Claims. (Cl. 266—12)

The present application is a continuation-in-part of our copending application Serial No. 48,578, now abandoned, filed August 10, 1960, and entitled, "Method for the Recovery of Gallium From Gallium-Containing Solutions."

The present invention relates to a method and apparatus for the recovery of gallium from gallium-containing solutions and more particularly, the present invention is primarily concerned with the recovery of gallium from sodium aluminate solutions, such as form an intermediate product in the recovery of aluminum hydroxide from bauxite.

It is well known that the alkaline sodium aluminate solutions which are used in the recovery of aluminum hydroxide from bauxite will contain increasing quantities of such impurities or additional constituents of the bauxite which are dissolved together with the aluminum oxide or aluminum hydroxide and which upon decomposition of the solution will not be precipitated together with the aluminum hydroxide. One of the compounds which is dissolved in the alkaline aluminate solution and which does not precipitate together with the aluminum hydroxide is sodium galliumate.

Many attempts have been made to utilize the enrichment of the aluminate solution with galliumate for the recovery of gallium.

In this connection, it has been suggested to carry out a precipitation of the aluminum hydroxide under such conditions that the residual solution or mother liquid will retain the galliumate. Thereby, precipitation of the aluminum hydroxide can be carried out with acids or so as to produce for instance calcium aluminate or cryolite.

It was also suggested to separate gallium electrolytically by subjecting the galliumate-containing sodium aluminate solution to electrolysis with a cathode consisting of moving liquid mercury and with one or more anodes made of a metal which under the conditions prevailing during the electrolysis remains insoluble. In this case, a terminal voltage of at least 3 volts, for instance between 3.8 and 4.2 volts or preferably between 3.8 and 4.0 volts is required and the cathode potential is to be at least 1.6 volts and preferably between 1.9 and 2.2 volts, while the current density at the cathode must be at least 0.35 ampere per 100 cm.$^2$ and preferably between 0.45 and 0.6 ampere per 100 cm.$^2$. The gallium will be dissolved in the cathodic mercury and can be recovered therefrom by means of a hydroxide of an alkali metal and the thus obtained alkali metal galliumate solution can then be electrolyzed in known manner with a solid cathode so as to obtain thereon a precipitation of metallic gallium.

However, the first mentioned method has the decided disadvantage that the entire process is highly complicated and that the major portion of the sodium hydroxide is destroyed during the process. Furthermore, it is not possible to incorporate the first mentioned method into the overall arrangement of the Bayer process, i.e. into a process wherein bauxite is digested with a caustic soda solution which dissolves the alumina and from which various oxides (but not gallium compounds) can be precipitated, whereupon the solution is filtered and the aluminum contained in the solution is precipitated as hydroxide.

The last mentioned method can be carried out without loss of the sodium hydroxide and can be arranged within the Bayer process. However, the electrolysis requires very considerable time and large quantities of mercury so that the last mentioned process too is not of the desired simplicity and low cost.

It is therefore an object of the present invention to overcome the disadvantages and difficulties which are inherent in the prior art methods.

It is a further object of the present invention to provide a method for the recovery of gallium from gallium-containing solutions which can be carried out in a simple and economical manner.

It is another object of the present invention to provide an apparatus in which gallium may be recovered from gallium-containing solutions in a simple and effective manner.

It is yet another object of the present invention to provide an apparatus of relatively simple construction in which gallium may be separated from solutions containing the same in a continuous or discontinuous manner.

It is still another object of the present invention to provide a simple and economical method of separating gallium from sodium aluminate solutions and of recovering the separated gallium, which method can be carried out in a continuous manner and in conjunction with the working up of bauxite or the like for the production of alumina.

Other objects and advantages of the present invention will become apparent from a further reading of the description and of the appended claims.

With the above and other objects in view, the present invention contemplates in a method of recovering gallium from an alkaline solution of a gallium compound, the step of reacting the solution with an alkali metal amalgam so as to reduce at least a portion of the gallium compound to metallic gallium, the metallic gallium being taken up by the amalgam and simultaneously transforming a portion of the alkali metal of the amalgam into the hydroxide of the alkali metal the thus-formed hydroxide being incorporated in the solution, whereby gallium is recovered from the solution.

According to a preferred embodiment of the present invention, the same is concerned with the recovery of gallium from an alkaline solution containing alumina and gallium oxide by reacting droplets of liquid sodium amalgam having a diameter of between about 0.15 and 1.5 mm. with the solution so as to reduce at least a portion of the dissolved gallium oxide to metallic gallium, the latter being taken up by the sodium amalgam, while simultaneously incorporating a portion of the sodium of the sodium amalgam into the solution in the form of sodium hydroxide, separating the thus-formed gallium-containing sodium amalgam from the solution, and recovering metallic gallium from the amalgam.

The present invention also contemplates in an arrangement adapted for the recovery of gallium from gallium-containing sodium aluminate solution and the like, in combination, reaction chamber means for reacting sodium amalgam with a gallium-containing solution so that at least a portion of the gallium of said solution will be taken up by said amalgam in exchange for a portion of the sodium thereof, thus forming a gallium-containing amalgam and a solution of reduced gallium content, separating means located above and communicating with the reaction chamber means for receiving the solution of reduced gallium content with a portion of gallium-containing amalgam distributed therethrough and for separating the amalgam portion from the solution of reduced gallium content so that thus-separated amalgam will flow downwardly into the reaction chamber means, conduit means communicating with the separating means and with the reacting chamber means for returning at least a portion of thus-separated solution from the separating means to the reaction chamber means, and extracting means operatively connected to the reaction chamber means for receiving gallium-containing amalgam and for extracting gallium therefrom.

According to a preferred embodiment of the present invention, an arrangement is provided adapted for recovery of a first amalgam-forming metal from a solution thereof, which arrangement comprises, in combination, reaction chamber means for reacting the amalgam of a second metal with a solution of the first metal so that at least a portion of the first metal of the solution will be taken up by the amalgam of the second metal in exchange for a portion of the second metal thereof, thus forming an amalgam containing the first metal and a solution containing a lesser proportion of the first metal and including a portion of the second metal, the reaction chamber means comprising a housing having an open upper and closed lower end portion, fluid distribution means including a closed distribution chamber located in the area of the upper end portion of the housing, and a plurality of ducts fluid permeable at their lower ends and spaced from each other, and communicating with, and extending downwardly from, the distribution chamber into the lower end portion of the housing, the reaction chamber means further comprising means for introducing under pressure first metal-containing solution into the distribution chamber, and means for substantially filling the space within the housing between the spaced ducts with amalgam of the second metal so that the solution of the first metal will be forced from the distribution chamber through the ducts into the lower portion of the amalgam filled space and will pass upwardly through the same thereby reacting with the amalgam, so as to exchange first metal of the solution against second metal of the amalgam, separating means located above the reaction chamber means and including a downwardly converging bottom portion communicating with the upper end portion of the housing for receiving the upwardly passing solution of reduced first metal content with a portion of first metal-containing amalgam distributed therethrough, and for gravity separation of the amalgam portion from the solution of reduced first metal content so that the thus separated amalgam will flow downwardly through the downwardly converging bottom portion of the separating means into the space in the reaction chamber, and extracting means operatively connected to the reaction chamber means for receiving first-metal-containing amalgam and for extracting first metal therefrom.

Thus, according to the present invention, gallium is recovered in a surprisingly simple and economical manner from an alkaline solution of a gallium compound such as an alkaline solution containing alumina and gallium oxide by treating the aluminate lye with sodium amalgam. Thereby, the amalgam reacts with the lye under reduction of the impurities dissolved in the lye so that the alkali concentration of the lye increases while gallium as well as other nobler metals will be reduced to their metallic state and will be taken up by the amalgam. The reaction proceeds very quickly and up to 90% of the gallium can be easily removed in this manner from the lye and will be taken up by the mercury of the amalgam.

An additional difficulty of the above described prior art method for the electrolytic recovery of gallium is found in the fact that the mercury which forms the cathode of the electrolytic process must form a continuous body in order to allow for the passage of current therethrough. Consequently, the relationship between volume and surface of the mercury cathode is unfavorable for the formation of a large contact area between the mercury and the electrolyte from which gallium is to be recovered. Furthermore, the moving and stirring of the mercury cathode must be carried out under carefully controlled conditions, since only in this manner, i.e. in a carefully controlled operation, the required renewal of the mercury surface can be achieved which is necessary for the separation of gallium from the electrolyte. In contrast thereto, according to the present invention as described above, it is possible to increase the surface area of the sodium amalgam practically to any desired extent since it is no longer necessary to introduce the mercury or to maintain the mercury as a continuous body. For instance, according to the present invention, the sodium amalgam can be so strongly stirred while in contact with the aluminate lye that the sodium amalgam will be separated into relatively large droplets. According to a preferred manner of carrying out the present invention, the sodium aluminate lye is introduced into the sodium amalgam through a plurality of nozzles having relatively small orifices and, in this manner, the amalgam will be separated into relatively small droplets. The relationship between surface area and volume changes in favor of surface area with decreasing size of the droplets and this again will speed up the reaction and reduce the total quantity of mercury required for carrying out the process to a fraction of the quantity of mercury which is needed according to prior art processes.

During the reaction between sodium aluminate lye and sodium amalgam in accordance with the present invention, a portion of the sodium of the sodium amalgam will be converted into sodium hydroxide and will then form part of the aluminate lye. Thus, at least a portion of the sodium which is lost during the Bayer process will be replaced by sodium hydroxide originating from the sodium amalgam. Thus, the formation of sodium hydroxide according to the process of the present invention which sodium hydroxide otherwise would have to be supplied from an outside source, will compensate to a considerable degree the electric energy which is required for forming sodium amalgam which is used for the present invention. The sodium amalgam which is required for the present process can be produced either in conventional manner from sodium chloride, or—and this has been found to be particularly advantageous and economical—sodium carbonate, which is one of the waste products of the alumina production, can be used as the starting material for producing the sodium amalgam.

The electrolytic separation of gallium in accordance with the above described prior art method, is preferably carried out in aluminate lye or sodium aluminate solutions which contain between about 140 and 150 g. sodium oxide per liter, since at higher concentrations the yield of gallium is greatly reduced. Thus, it is a further advantage of the method of the present invention that sodium aluminate solutions of any desired concentration can be subjected to the process. Thus, it is possible without difficulties to separate gallium from the heavy liquors of the Bayer process, i.e. from the highly concentrated solutions which are produced by partial evaporation and which are to be used for attacking new bauxite. These concentrated aluminate solutions contain usually about 300 g. sodium oxide per liter.

The present process for the recovery of gallium can be incorporated without difficulties into the Bayer process for the recovery of alumina, and this can be done so as to recover gallium in a continuous manner. For instance, a portion of the evaporated aluminate solution or heavy liquor can be treated with sodium amalgam according to the present invention and thus freed of gallium, and the thus purified heavy liquor can then be again combined with the portion of heavy liquor which has not been subjected to gallium separation. In this manner, the gallium concentration in the aluminate solution can be maintained at a constant level by separating gallium in a quantity which corresponds to the quantity of gallium which is dissolved in the aluminate solution during the decomposition of bauxite.

A suitable arrangement of the apparatus required for carrying out the process will allow to make the process continuous and nearly fully automatic. For instance, several reaction vessels can be arranged in series, whereby the sodium amalgam is passed to these reaction vessels either concurrently or countercurrently to the galliumate-containing sodium aluminate solution so that a complete utilization of the amalgam is assured. The gallium-containing amalgam is then withdrawn from the last reaction vessel and gallium is extracted therefrom and subsequently electrolytically precipitated in conventional manner. The sodium amalgam is then again enriched with sodium and returned to the reaction vessels for extracting gallium from subsequent portions of the aluminate solution.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
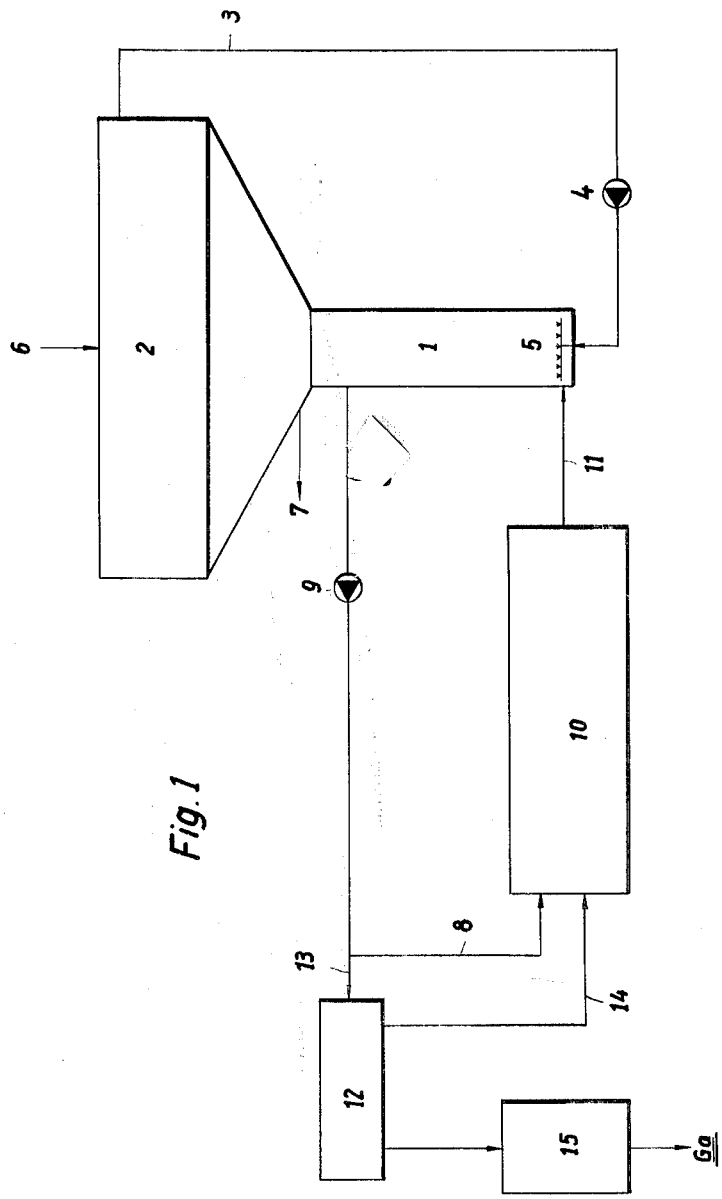
FIG. 1 is a schematic representation of an arrangement for the recovery of gallium in accordance with the present invention.

Referring now to FIG. 1, it will be seen that the arrangement according to the present invention comprises a reaction chamber 1 and a separating device 2 superposed upon reaction chamber 1 and combined with the same into a unitary structure.

Reaction chamber 1 serves for reacting, with liquid sodium amalgam, for instance, gallium-containing sodium aluminate lye such as is obtained in the Bayer process of bauxite decomposition, whereby gallium will be dissolved in the mercury of the sodium amalgam, forming gallium amalgam, or more accurately gallium-sodium amalgam and in exchange sodium of the sodium amalgam will be withdrawn therefrom and dissolved in the sodium aluminate lye.

Separating device 2 serves for separating by sedimentation amalgam particles which were carried along by the aluminate lye from reaction chamber 1. According to the illustrated preferred embodiment, the separated amalgam will flow downwardly along the inclined bottom of separating device 2, back into reaction chamber 1.

Conduit 3 leads from separating device 2 via pump 4 to the inlet in the bottom portion of reaction chamber 1. Clear sodium aluminate lye free of amalgam passes through conduit 3 into the lower portion of reaction chamber 1 to react therein with sodium amalgam so that a portion of the sodium of the amalgam will be dissolved in the aluminate lye and, in exchange, a portion of the gallium of the aluminate lye will form gallium amalgam. In order to obtain a large reactive contact area between the gallium-containing sodium aluminate lye and the sodium amalgam, the aluminate lye is pressed through nozzles 5 into the liquid sodium amalgam filling the free space of reaction chamber 1.

Conduit 6 serves for introducing fresh gallium-containing aluminate lye into separating device 2, and conduit 7 which communicates with the lower portion of separating device 2 serves for withdrawing gallium-poor lye or solution from the gallium extracting arrangement. The sodium aluminate solution withdrawn through conduit 7, for instance, may be reintroduced into the aluminum oxide (Bayer) process.

When it is desired to carry out the gallium extraction in a continuous manner, it is necessary to replenish the sodium content of the amalgam at regular intervals. For this purpose, the amalgam is withdrawn from reaction chamber 1 through conduit 8 via pump 9 and introduced into a conventional electrolytic cell for the electrolysis of alkali metal chlorides. In this cell 10, the sodium content of the amalgam is replenished and the thus reconstituted sodium amalgam is then returned to reaction chamber 1 by way of conduit 11. However, it is also possible to replenish the sodium content of the amalgam in a different manner, for instance, by adding sodium to the amalgam.

When the gallium content of the amalgam has risen to such an extent that it is desirable to extract gallium therefrom, it is preferred to withdraw such amalgam of relatively high gallium content and low sodium content through conduit 13 (in parallel to conduit 8) into extraction vessel 12. After separating gallium from the amalgam, the thus formed mercury, or sodium and gallium-poor amalgam, is then passed through conduit 14 into electrolytic cell 10 for being enriched with sodium, and from there through conduit 11 back into reaction chamber 1. It is of course, also possible to withdraw amalgam from the reaction chamber 1 through conduit 8 and to pass part of the withdrawn amalgam directly to electrolytic cell 10, and another part via extraction vessel 12 to cell 10.

Gallium is then separated from the gallium-containing solution formed in extraction vessel 12 by electrolysis in electrolytic cell 15. Sometimes it is desirable to subject the gallium-containing solution formed in extraction vessel 12 to conventional purification steps prior to introducing the solution into electrolytic cell 15.

Figure 2:
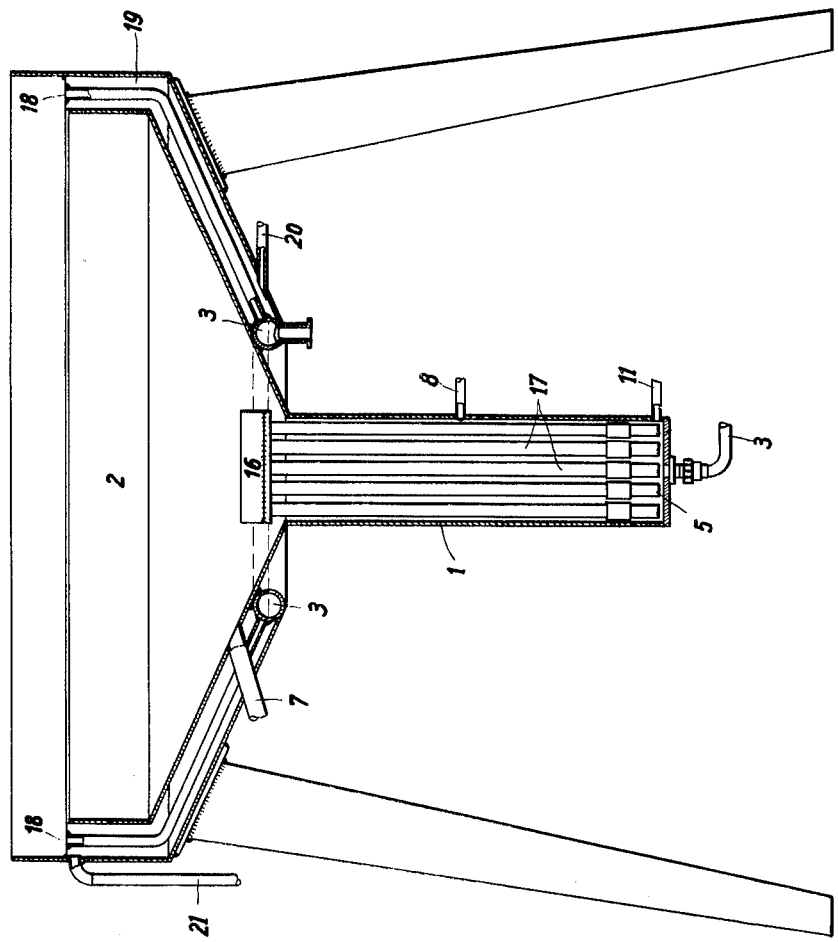
FIG. 2 is an elevational view partially in cross section of a preferred embodiment of a reaction chamber for withdrawing gallium from the solution under formation of gallium amalgam and of separating means for separating amalgam from the gallium-poor solution leaving the reaction chamber.

FIG. 2 will serve to ilustrate in some more detail the structure and operation of the combined reaction and separating means.

Reaction chamber 1 is preferably of cylindrical configuration having a height of between 200 and 1000 mm., most preferably of about 500 mm. and a diameter of between 150 and 1000 mm. The gallium-containing solution is introduced into reaction chamber 1 through conduit 3 which communicates with distribution chamber 16 arranged in the illustrated embodiment in the area of the upper end portion of reaction chamber 1, somewhat above the latter. Closed distribution chamber 16 communicates with a plurality of downwardly extending ducts 17 which terminate in the lower portion, near the bottom of reaction chamber 1. Preferably, there are arranged between 3 and 20, most preferably about 10 ducts per 100 cm.$^2$ of the horizontal cross sectional area of reaction chamber 1, and each of ducts 17 preferably has a diameter of about 20 mm. Ducts 17 are immersed at least throughout most of their length in the sodium amalgam filling the remaining free space in reaction chamber 1. The gallium-containing clear sodium aluminate lye or the like flows under pressure through conduit 3 into distribution chamber 16 and from there through ducts 17 to the lower portion of reaction chamber 1. The lower ends of ducts 17 carry a nozzle arrangement 5 through which the gallium-containing solution is pressed in finely subdivided form into the liquid amalgam surrounding ducts 17. Nozzle arrangement 5 will also serve to prevent entry of amalgam into ducts 17.

The hourly yield of this apparatus, under otherwise equal conditions, will depend on the amount of amalgam introduced into reaction chamber 1. Since the height of the amalgam column is controlled by the height of reaction chamber 1, the hourly capacity can be increased by increasing the diameter of reaction chamber 1.

During the turbulent upward passage of the gallium-containing solution through the liquid amalgam in reaction chamber 1, a portion of the amalgam will be carried along in the form of fine droplets into separating device 2. In separating device 2, these fine amalgam droplets will flow downwardly by force of gravity and by such dimentation eventually will flow along the inclined bottom of separating device 2 back into reaction chamber 1. In order to facilitate and speed up the flow of amalgam droplets along the inclined bottom of separating device 2, it is desirable to arrange a suitable stirring apparatus (not shown) in separating device 2. Foam formed during the reaction between gallium-containing solution and amalgam will accrue on the free upper surface of the gallium-containing solution in separating device 2 and will disintegrate.

According to the embodiment of FIG. 2, the clear solution will flow from separating device 2 through outlet tube 18 into conduit 3 via pump 4 and distribution chamber 16 into reaction chamber 1. Conduit 3 preferably is arranged as a circular conduit communicating with a plurality of outlet tubes 18. The speed with which the solution is circulated from reaction chamber 1 to separating device 2 and back to reaction chamber 1 will determine the efficiency and yield of the gallium separation. If the speed is chosen too low, the circulation will be too slow for optimum gallium-sodium exchange, and if the circulating speed is too high, too much of the amalgam will be carried upwardly into separating device 2.

Experiments have shown that very good results are achieved by circulating an amount of solution which is equal to between 0.2 and 2 liters per minute, preferably about 1 liter per minute, multiplied by the number of ducts 17.

Heat created by the gallium-sodium exchange will cause a reduction in yield. In view thereof, it is desirable to provide separating device 2 with a cooling jacket 19 which will serve the double purpose of cooling the solution contained in separating device 2 and also cooling solution flowing through a portion of outlet tubes 18 which is located within cooling jacket 19. In this manner, the solution entering reaction chamber 1 can be cooled sufficiently to prevent undue heating up of the reaction mixture in reaction chamber 1. The cooling water enters jacket 19 through inlet 20 and is withdrawn through outlet 21. The greater the number of outlet tubes 18 located in part within cooling jacket 19, the better will be the cooling effect. Conduit 8 serves for withdrawing amalgam of reduced sodium content from reaction chamber 1, for further processing as discussed in connection with FIG. 1. Preferably a conventional mercury cup-and-cone arrangement (not shown) is arranged in connection with outlet 8 to prevent carrying along of solution with the withdrawn amalgam.

The replenished sodium amalgam is then reintroduced into reaction chamber 1 through conduit 11, as more fully described in connection with FIG. 1.

Reaction chamber 1 and separating device 2 may be built of iron. Distribution chamber 16 may consist for instance of iron or synthetic material.

Figure 3:
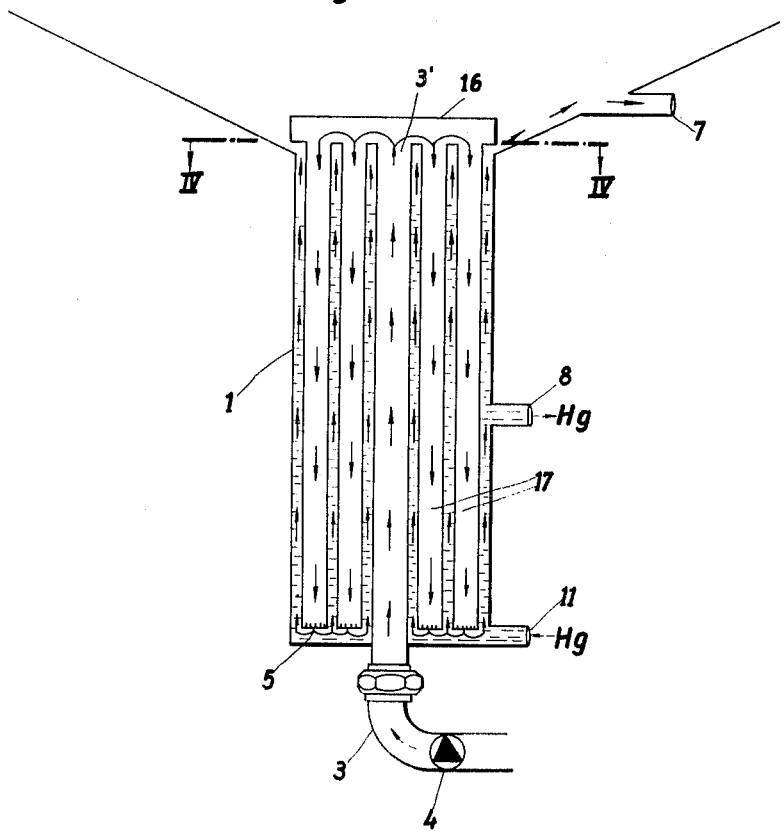
FIG. 3 is a schematic elevational cross sectional view on a somewhat larger scale of the reaction chamber shown in FIG. 2.

More specifically, reaction chamber 1 may be constructed as illustrated in FIG. 3. The solution introduced through conduit 3 is pressed by pump 4 into the continuation or riser 3′ of conduit 3 which communicates with closed distribution chamber 16 from which the solution is then pressed downwardly through ducts 17 and after passing through nozzles 5, the solution will thus be pressed in finely subdivided form into the amalgam surrounding ducts 17. Amalgam is introduced through conduit 11 and is withdrawn through outlet 8. After circulating as described in connection with FIGS. 1 and 2, a portion of the solution, or the gallium-poor solution, is withdrawn through conduit 7.

Figure 4:
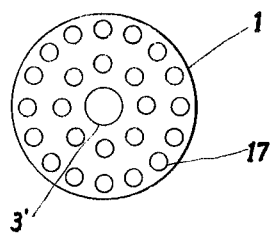
FIG. 4 is a cross sectional plan view taken along line IV—IV of FIG. 3.

FIG. 4 shows the upper opening of conduit 3′ through which the solution enters distribution chamber 16, and of ducts 17 through which the solution passes downwardly from distribution chamber 16 into contact with the amalgam in the lower portion of reaction chamber 1.

The diameter of nozzles 5 preferably will be about 2 mm. and usually will be between 1 and 3 mm. Assuming that the mercury, i.e. amalgam column in reaction chamber 1 has a height of 500 mm., the pressure exerted by pump 4 preferably will be 1 atmosphere above atmospheric pressure. This pressure is not directly proportional to the height of the amalgam column. For instance, in case the amalgam column has a height of 1000 mm., it will suffice to supply a pressure of 1.7 atmospheres above atmospheric pressure since the resistance offered by the conduit and ducts does not change materially by such increase in the height of the amalgam column.

The cross sectional area of conduit 3 preferably is at least equal to and up to twice the cross sectional area of riser 3′, and the sum total of the cross sectional areas of all ducts 17 preferably will be about equal to the cross sectional area of riser 3′.

The entire free space in reaction chamber 1 is filled with amalgam. According to FIGS. 2 and 3 conduit 8 for withdrawal of amalgam communicates with reaction chamber 1 at about one half the height of the latter because at that point amalgam will be withdrawn having a good average content of gallium. Care must be taken that reaction chamber 1 will remain filled with amalgam, not withstanding the withdrawal of a portion thereof through conduit 8. This may be achieved, for instance by arranging electrolytic cell 10 at a level corresponding to the upper level of amalgam which is to be maintained in reaction chamber 1.

Referring again to the drawings, the arrangement according to the present invention may be operated by introducing gallium-containing sodium aluminate lye accruing in the Bayer aluminum oxide process through a conduit 6 into separating device 2 which is arranged above and unitary with reaction chamber 1. The thus introduced aluminate lye plus already reacted solution of reduced gallium content is then passed through conduit 3 and pump 4 in finely subdivided form into the liquid sodium amalgam located in reaction chamber 1, and will react therewith. Solution of reduced gallium content carrying along droplets of amalgam will pass upwardly into separating device 2. The carried along amalgam will flow back into reaction chamber 1, and after repeated circulation, the gallium-poor solution which is free of amalgam will be returned to the Bayer process through conduit 7 and will accept additional sodium galliumate before being returned through conduit 6 into separating device 2. The gallium enriched amalgam of reduced sodium content, or a portion thereof is extracted in extraction vessel 12 and then again enriched with sodium in electrolytic cell 10. Another portion of the sodium-depleted amalgam may be enriched in electrolytic cell 10 without first passing through extraction vessel 12. The sodium enriched amalgam is returned to reaction chamber 1 through conduit 11 while the separated gallium-containing solution formed in extraction vessel 12, preferably after purification, is subjected to electrolytic separation of gallium in cell 15.

The following examples are given as illustrative only without, however, limiting the invention to the specific details of the examples.

*Example I*

2 liters of sodium aluminate solution as it accrues in the decomposition of bauxite and containing about 290 g. sodium oxide per liter and 300 mg. gallium oxide ($Ga_2O_3$) are treated with 1000 g. of sodium amalgam containing about 0.2% sodium. The amalgam drops into the vessel containing the sodium aluminate solution through a plurality of nozzles so that thin threads of amalgam are formed which separate into individual droplets. These droplets pass downwardly through the sodium aluminate solution and collect on the bottom of the vessel from where the amalgam is recycled to the nozzles and again introduced into the sodium aluminate solution. Within 1 hour, the gallium content of the solution has dropped by 30 mg. per liter while the sodium content of the sodium amalgam has been reduced to about 0.02%.

*Example II*

2 liters of the sodium aluminate solution described in Example I, are treated with 8000 g. of sodium amalgam having initially a sodium content of 0.2%. Again, the amalgam is dropped into the sodium aluminate solution through a plurality of nozzles, collects at the bottom of the treating vessel and is from there pumped to the nozzles and reintroduced into the solution. After 3 hours, the gallium oxide content of the solution has been reduced from 300 mg. per liter to 60 mg. per liter, while the sodium content of the amalgam has been lowered to 0.015%.

It is desirable to proceed in accordance with Example I when gallium has to be recovered from a relatively large volume of sodium aluminate solution with the use of a relatively small quantity of mercury. The initial sodium content of the amalgam can be considerably higher than the percentage figures indicated above and in this manner, the quantity of mercury required for recovery of gallium can be further reduced.

The conditions of Example II are representative of the process when a relatively small quantity of gallium-containing sodium aluminate solution is to be treated in such a manner as to obtain a high yield of recovered gallium.

Duration of the precess which has been described as between 1 and 3 hours can be further reduced by reducing the size of the individual mercury droplets, i.e. by increasing the amalgam surface area which will be in contact with the gallium-containing aluminate solution.

The recovery of gallium from the sodium amalgam is carried out in conventional manner, preferably by washing the amalgam with nitric acid, however, it is also possible to subject the gallium-containing sodium amalgam to extraction with sodium hydroxide, a process which also is known in the art.

Preferably, particularly in large scale industrial installations, the gallium-containing amalgam of reduced sodium content which collects at the bottom of the reaction vessel will first be passed to a conventional sodium amalgam producing electric cell and therein will be enriched with sodium. From the sodium enrichment cell, the amalgam is then pumped again to the nozzles from which it drops into the sodium aluminate solution.

The gallium-containing sodium aluminate solutions which may be treated according to the present invention may either be sodium aluminate solutions as they are obtained by decomposition of bauxite, i.e. sodium aluminate solution containing a high percentage of aluminum oxide or the mother liquor which remains after crystallization and separation of aluminum hydroxide, i.e. a solution which contains only a relatively small percentage of aluminum oxide. Since the galliumate which is introduced into the solution during the decomposition of the bauxite will not precipitate together with aluminum hydroxide, the galliumate will be found in the aluminate solutions before as well as after precipitation of aluminum hydroxide and can be extracted with sodium amalgam from solutions of high aluminum oxide concentration as well as from solutions of low aluminum oxide concentration.

*Example IIA*

165 liters of the sodium aluminate solution as it accrues in the decomposition of bauxite and containing about 290 g. of sodium oxide per liter and 368 mg. of gallium oxide ($Ga_2O_3$) are treated with 84 kg. of sodium amalgam containing about 0.238% sodium. The sodium aluminate solution is upwardly pressed into a reaction chamber which has a height of 500 mm. and contains a closed distribution chamber with a plurality of thin ducts (10 per dm.$^2$) carrying nozzles at their lower ends, in which chamber the free space between the ducts is filled with said sodium amalgam.

The pressure applied to the solution is about 1 atm. above atmospheric pressure.

After having reached the top of the distribution chamber the sodium aluminate solution is pressed downwardly through the thin ducts, and after having passed the nozzles it is pressed in finely subdivided form into the amalgam. The sodium aluminate solution rises in the amalgam and collects upon its surface. From there the solution is sucked off and recycled to the ducts and the nozzles thereof and again introduced into the sodium amalgam.

Within one hour the gallium content of the solution has been reduced from 368 mg. of $Ga_2O_3$ to 300 mg. of $Ga_2O_3$ per liter, while the sodium content of the amalgam has been lowered to 0.155%. After two hours the gallium content in the solution is 246 mg. $Ga_2O_3$ per liter, and the sodium content of the sodium amalgam is 0.077%. The speed with which the solution is circulated, is equal to 1 liter per minute per one duct.

*Example III*

A continuous manner of carrying out the process of the present invention is illustrated in the following flow diagram:

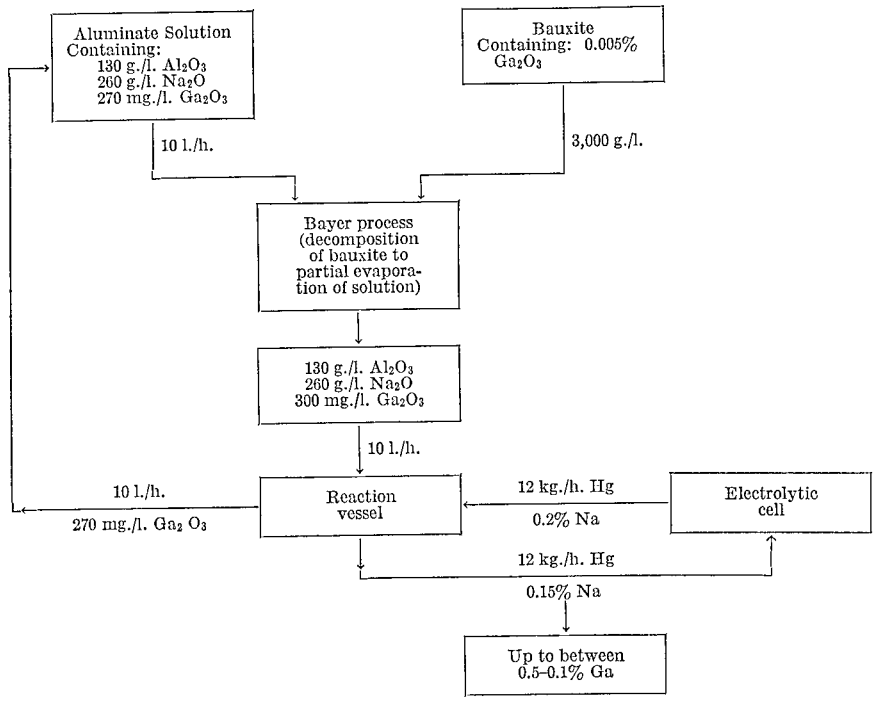

During operation of the process as schematically shown above, the gallium content of the sodium amalgam will rise from 0% to between 0.1 and 0.5%. Once the gallium concentration in the amalgam has reached the desired maximum value, the gallium-containing amalgam is withdrawn and replaced with gallium-free amalgam, while gallium is extracted from the withdrawn amalgam. However, the gallium extraction also can be carried out in a continuous manner by continuously separating a portion of the amalgam flowing towards the electrolytic cell, extracting gallium and other elements contained in the sodium amalgam therefrom, for instance with nitric acid, and then returning the thus treated portion of the sodium amalgam to the electrolytic cell in which the sodium content of the amalgam is restored.

Generally, the sodium aluminate solutions of the Bayer process which are treated in accordance with the present invention will have a composition within the following ranges:

|  | G./l. |
|---|---|
| $Al_2O_3$ | 60–200 |
| $Na_2O$ | 120–300 |
| $Ga_2O_3$ | 0.1–0.4 |
| $SiO_2$ | 0.2–3.0 |
| ZnO | 0.05–0.2 |
| $Cr_2O_3$ | 0.01–0.1 |
| $Fe_2O_3$ | 0.01–0.1 |
| $MoO_3$ | 0.3–1.2 |
| $V_2O_5$ | 0.4–2.0 |
| $P_2O_5$ | 0.6–3.0 |

The maximum sodium content of the sodium amalgam depends on the operating temperature and will range from about 0.35% to 2%. The minimum sodium concentration at which for practical purposes gallium separation will substantially come to halt is about 0.001%. Generally, the process is carried out at ambient temperatures of between about 15 and 20° C. and under such conditions, the maximum sodium content of the amalgam preferably will be 0.2% and the minimum content 0.02%. In any event, the sodium content of the amalgam will be so chosen that the amalgam is capable of forming droplets, i.e., is liquid at the temperatures prevailing during the process.

*Example IV*

2 liters of sodium aluminate solution containing

|  | G./l. |
|---|---|
| $Al_2O_3$ | 130 |
| $Na_2O$ free | 260 |
| $Na_2O$ total | 280 |
| $Ga_2O_3$ | 0.3 |
| $SiO_2$ | 1.2 |
| ZnO | 0.2 |
| $Cr_2O_3$ | 0.02 |
| $Fe_2O_3$ | 0.01 |
| $MoO_3$ | 1.0 |
| $V_2O_5$ | 1.5 |
| $P_2O_5$ | 2.0 | are treated with 1000 g. sodium amalgam containing 0.2% sodium.

The sodium aluminate solution is contained in a cylindrical vessel forming therein a liquid column of about 60 mm. diameter and 75 cm. height. The sodium amalgam is introduced through nozzles arranged above the vessel and evenly distributed over the cross section of the same, each nozzle having a diameter of 1 mm. The amalgam drops into the column of liquid and collects at the bottom of the vessel from where the amalgam is pumped back to the nozzles. The amalgam circulates between 50 and 70 times per hour. Already after 1 hour, the gallium content of the solution has dropped to 0.22 g./l. and the composition of the solution is now as follows:

| | G./l. |
|---|---|
| $Al_2O_3$ | 130 |
| $Na_2O_3$ free | 263 |
| $Na_2O_3$ total | 282 |
| $Ga_2O_3$ | 0.22 |
| $SiO_2$ | 1.2 |
| ZnO | 0.08 |
| $Cr_2O_3$ | --- |
| $Fe_2O_3$ | --- |
| $MoO_3$ | 1.0 |
| $V_2O_5$ | 1.5 |
| $P_2O_5$ | 2.0 |

The sodium content of the amalgam is now 0.02% and the gallium content 0.01%.

*Example V*

2 liters of Bayer process aluminate solution of the composition described in Example IV are treated with 8000 g. of sodium amalgam containing 0.2% sodium for a period of 3 hours in the manner described in Example IV. At the end of the 3-hour treatment, it is found that the aluminate solution has the following composition:

| | G./l. |
|---|---|
| $Al_2O_3$ | 130 |
| $Na_2O_3$ free | 266 |
| $Na_2O_3$ total | 284 |
| $Ga_2O_3$ | 0.06 |
| $SiO_2$ | 1.2 |
| ZnO | --- |
| $Cr_2O_3$ | --- |
| $Fe_2O_3$ | --- |
| $MoO_3$ | 0.2 |
| $V_2O_5$ | 0.5 |
| $P_2O_5$ | 2.0 | and the amalgam contains:

| | Percent |
|---|---|
| Ga | 0.0045 |
| Zn | 0.002 |
| Fe | 0.0001 |
| Cr | 0.0001 |
| Mo | 0.006 |
| V | 0.0003 |

As described further above, it is desirable to provide the largest possible contact area between amalgam and aluminate solution. Preferably, the amalgam is broken up into droplets having a diameter of between 0.15 and 1.5 mm. This can be accomplished by pressing the amalgam through nozzle orifices having a diameter of between 0.1 and 1.0 mm. After passing through the nozzle orifices, the amalgam threads breaks up into droplets of the above diameters.

Thus, according to the present invention, gallium can be separated from alkaline solutions containing the same, by reacting the gallium-containing solution with sodium amalgam so that a portion of the sodium of the amalgam will be transformed into sodium hydroxide, thus increasing the content of free $Na_2O$ of the solution, while the gallium will be taken up by the amalgam. The process can be easily carried out in a continuous manner by circulating sodium amalgam through the gallium-containing solution while continuously replacing part of the treated solution with fresh solution, and part of the gallium-containing amalgam with amalgam from which gallium has been separated. Furthermore, the sodium content of the circulating amalgam is preferably replenished after the amalgam has been withdrawn from the solution and before it is reintroduced into the same, in order to compensate for the loss of sodium in the form of sodium hydroxide going into the solution.

It will be understood that each of the elements described above, or two or more together, may also find a useful application in other types of gallium separating arrangements differing from the types described above.

While the invention has been illustrated and described as embodied in a method and device for recovering gallium from gallium-containing sodium aluminate solutions and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an arrangement adapted for recovery of gallium from gallium-containing sodium aluminate solution and the like, in combination, a reaction chamber for reacting sodium amalgam with a gallium containing solution so that at least a portion of the gallium of said solution will be taken up by said amalgam in exchange for a portion of the sodium thereof, thus forming a gallium-containing amalgam and a solution of reduced gallium content, said reaction chamber comprising a housing having an open upper and closed lower end portion, fluid distribution means including a closed distribution chamber located in the area of said upper end portion of said housing, a plurality of vertical ducts terminating at their lower ends in a perforated horizontal plate and spaced from each other, communicating with and extending downwardly from said distribution chamber into the lower end portion of said housing and inlet means for introducing under pressure from below gallium-containing solution into said distribution chamber; separating means located above said reaction chamber means and including a downwardly converging bottom portion communicating with said upper end portion of said housing for receiving said upwardly passing solution of reduced gallium content with a portion of gallium-containing amalgam distributed therethrough, and for gravity separation of said amalgam portion from said solution of reduced gallium content so that the thus separated amalgam will flow downwardly through said downwardly converging bottom portion of said separating means into a space in said reaction chamber; first conduit means communicating with said separating means above said converging bottom portion thereof for returning at least a portion of thus-separated solution from said separating means under pressure to said inlet means leading to said distribution chamber; extracting means operatively connected to said reaction chamber means for receiving gallium-containing amalgam and for extracting gallium therefrom; sodium supplying means operatively connected to said extracting means for receiving therefrom extracted amalgam and for increasing the sodium content thereof; and second conduit means communicating with said sodium supplying means and said reaction chamber for passing sodium enriched amalgam from said sodium supplying means to said reaction chamber.

2. In an arrangement adapted for recovery of gallium from gallium-containing sodium aluminate solution and the like, in combination, a reaction chamber for reacting sodium amalgam with a gallium-containing solution so that at least a portion of the gallium of said solution will be taken up by said amalgam in exchange for a portion of the sodium thereof, thus forming a gallium-containing amalgam and a solution of reduced gallium content, said reaction chamber comprising a housing having an open upper and closed lower end portion, fluid distribution means including a closed distribution chamber located in the area of said upper end portion of said housing, a plurality of vertical ducts terminating at their lower ends in a perforated horizontal plate and spaced from each other, communicating with and extending downwardly from said distribution chamber into the lower end portion of said housing and inlet means for introducing under pressure from below gallium-containing solution into said distribution chamber; separating means located above said reaction chamber means and including a downwardly converging bottom portion communicating with said upper end portion of said housing for receiving said upwardly passing solution of reduced gallium content with a portion of gallium-containing amalgam distributed therethrough, and for gravity separation of said amalgam portion from said solution of reduced gallium content so that the thus separated amalgam will flow downwardly through said downwardly converging bottom portion of said separating means into a space in said reaction chamber; means for introducing fresh-gallium-containing sodium aluminate solution into said separating means above said downwardly converging bottom portion thereof; first conduit means communicating with said separating means above said converging bottom portion thereof for returning at least a portion of thus-separated solution from said separating means under pressure to said inlet means leading to said distribution chamber; extracting means operatively connected to said reaction chamber means for receiving gallium-containing amalgam and for extracting gallium therefrom; sodium supplying means operatively connected to said extracting means for receiving therefrom extracted amalgam and for increasing the sodium content thereof; and second conduit means communicating with said sodium supplying means and said reaction chamber for passing sodium enriched amalgam from said sodium supplying means to said reaction chamber.

3. In an arrangement adapted for recovery of a first amalgam-forming metal from a solution thereof, in combination, a reaction chamber for reacting the amalgam of a second metal with a solution of said first metal so that at least a portion of said first metal of said solution will be taken up by said amalgam of said second metal in exchange for a portion of said second metal thereof, thus forming an amalgam containing said first metal and a solution containing a lesser proportion of said first metal and including a portion of said second metal, said reaction chamber comprising a housing having an open upper and closed lower end portion, fluid distribution means including a closed distribution chamber located in the area of said upper end portion of said housing, a plurality of vertical ducts terminating at their lower ends in a perforated horizontal plate and spaced from each other, communicating with and extending downwardly from said distribution chamber into the lower end portion of said housing and conduit means for introducing under pressure from below first metal-containing solution into said distribution chamber; separating means located above said reaction chamber means and including a downwardly converging bottom portion communicating with said upper end portion of said housing for receiving said upwardly passing solution of reduced first metal content with a portion of first metal-containing amalgam distributed therethrough, and for gravity separation of said amalgam portion from said solution of reduced first metal content so that the thus separated amalgam will flow downwardly through said downwardly converging bottom portion of said separating means into a space in said reaction chamber; and extracting means operatively connected to said reaction chamber for receiving first metal-containing amalgam and for extracting first metal therefrom.

References Cited by the Examiner

UNITED STATES PATENTS

| 1,505,104 | 8/1924 | Moerk | 204—33 XR |
| 2,279,580 | 4/1942 | Miner | 266—12 |
| 2,907,561 | 10/1959 | Newson | 266—12 |
| 2,978,300 | 4/1961 | McCowen et al. | 23—271 XR |
| 3,003,867 | 10/1961 | Lerner | 75—121 |
| 3,029,144 | 4/1962 | Karpuik et al. | 75—121 |

OTHER REFERENCES

Bretque, P.: "Gallium Recovery from Bauscite," in Journal of Metals, vol. 8 (No. 11), November 1956, pages 1528–1529.

WHITMORE A. WILTZ, *Primary Examiner.*

RAY K. WINDHAM, JAMES H. TAYMAN, JR.,
*Examiners.*